A. S. CARLSON.
NUT LOCK.
APPLICATION FILED APR. 17, 1917.
1,269,386.
Patented June 11, 1918.
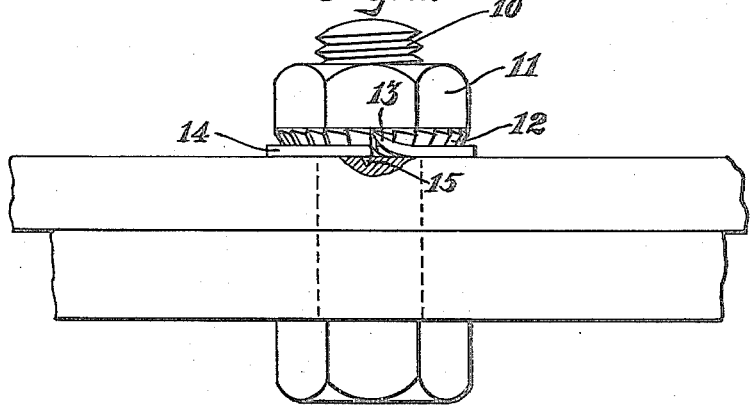
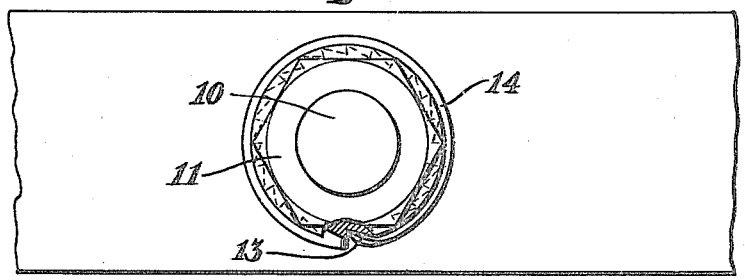
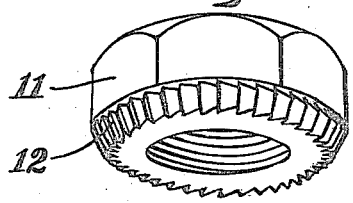
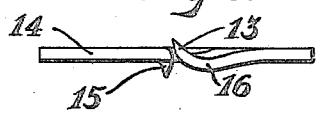
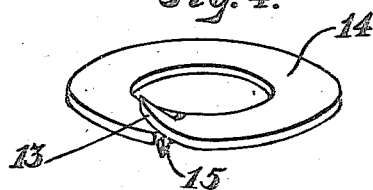
Inventor
Axel S. Carlson
by Hazard & Miller
Att'ys.

UNITED STATES PATENT OFFICE.

AXEL S. CARLSON, OF JEROME, ARIZONA.

NUT-LOCK.

1,269,386.

Specification of Letters Patent.

Patented June 11, 1918.

Application filed April 17, 1917. Serial No. 162,718.

*To all whom it may concern:*

Be it known that I, AXEL S. CARLSON, a citizen of the United States, residing at Jerome, in the county of Yavapai and State of Arizona, have invented new and useful Improvements in Nut-Locks, of which the following is a specification.

My object is to improve the lay-out and details of a nut lock construction and especially to provide a nut having a beveled ratchet face outside of the bearing face and a lock nut washer having a spring pawl to engage the ratchet face, the spring pawl being out of the compression zone so that tightening the nut will not smash the pawl.

Figure 1 is a view in side elevation illustrating a bolt and nut fitted with the locking means with which the present invention is concerned and with a portion of one of the bolted members broken away to more clearly disclose the gripping action of the lock washer.

Fig. 2 is a view in plan illustrating the nut and lock washer in position and with a portion of the nut broken away to clearly set forth the construction of the pawl tooth by which the nut is engaged.

Fig. 3 is a view in perspective illustrating the specially prepared nut.

Fig. 4 is a view in perspective illustrating the lock washer used with the nut disclosed in Fig. 3.

Fig. 5 is a view in side elevation illustrating the preferred form of the lock washer and particularly discloses the means provided for causing the nut to be positively engaged by the pawl tooth upon the washer.

Fig. 6 is a view in side elevation showing a simplified form of the washer disclosed in Fig. 5.

Referring more particularly to the drawings, 10 indicates a bolt which is externally threaded and is adapted to receive a nut 11, here shown as hexagonal in shape. The bolt is of common construction, however, the nut is specially formed and has an inclined circular ratchet 12 formed around its lower edge outside of the bearing surface. The teeth of this ratchet are adapted to be engaged by a pawl tooth 13 which is formed integral with one end of a split lock washer 14. This tooth is turned upwardly and its inner face is beveled, as well as inclined, to conform to the inclination of the ratchet teeth. Attention is here directed to the fact that the under surface of the nut 11 is smooth and will not positively stick to the face of the washer 14 against which it is drawn. The opposite end of the lock washer 14 is formed with a downturned tang 15 which engages the surface of one of the pieces being bolted together. It will thus be seen that when the nut is tightened down upon the washer, this tang will be depressed into the bolted piece and the ratchet teeth will be successively engaged by the pawl tooth 13.

As a means for insuring that the pawl tooth will positively engage the ratchet, a slight downward bend 16 is formed in the washer and adjacent the pawl tooth. As the nut is tightened, this bend will be straightened and will cause the tooth to raise and become rigidly seated against the ratchet teeth. A modified form of the invention eliminates this portion, as particularly shown in Fig. 6.

In operation, the lock washer is placed upon the bolt and the nut 11 is drawn down thereagainst. As the nut reaches its final seated position, the ratchet upon it will be positively engaged by the pawl tooth 13 and the tang 15 will be firmly embedded within the bolted piece, thereby preventing rotation of the nut in relation to the bolt, or the piece being bolted. The ratchet face 12 upon the nut is outside of the bearing surface of the nut and the pawl 13 is outside of the compression zone of the washer so that tightening the nut against the washer will not smash the pawl but on the contrary will increase the pressure of the pawl against the ratchet.

It will thus be seen that the nut locking device here provided is simple and effective in operation and may be inexpensively manufactured.

While I have shown the preferred construction of my nut lock as now known to me, it will be understood that various changes in the combination, construction and arrangement of parts may be made by those skilled in the art without departing from the spirit of my invention.

I claim:

In a nut lock construction, a threaded bolt, a nut screw-seated upon the bolt and having an inclined ratchet face outside of the bearing face, a washer adapted to fit upon the bolt against the bearing face of the nut; said washer being split from the bolt opening to the outer edge and said washer being bent downwardly upon radial lines parallel with the split; a spring pawl bent upwardly from said downwardly bent portion and along the split, and a downturned tang at the opposite side of the split from the pawl.

In testimony whereof I have signed my name to this specification.

AXEL S. CARLSON.